May 9, 1933. D. GERBER 1,907,954
CYLINDER AND PIPE CUTTING MACHINE
Filed May 15, 1931 4 Sheets-Sheet 1

INVENTOR
DWIGHT GERBER.
BY
ATTORNEY

May 9, 1933.　　　D. GERBER　　　1,907,954
CYLINDER AND PIPE CUTTING MACHINE
Filed May 15, 1931　　　4 Sheets-Sheet 3

INVENTOR
DWIGHT GERBER
BY
ATTORNEY

May 9, 1933.　　　　　D. GERBER　　　　　1,907,954
CYLINDER AND PIPE CUTTING MACHINE
Filed May 15, 1931　　　4 Sheets-Sheet 4
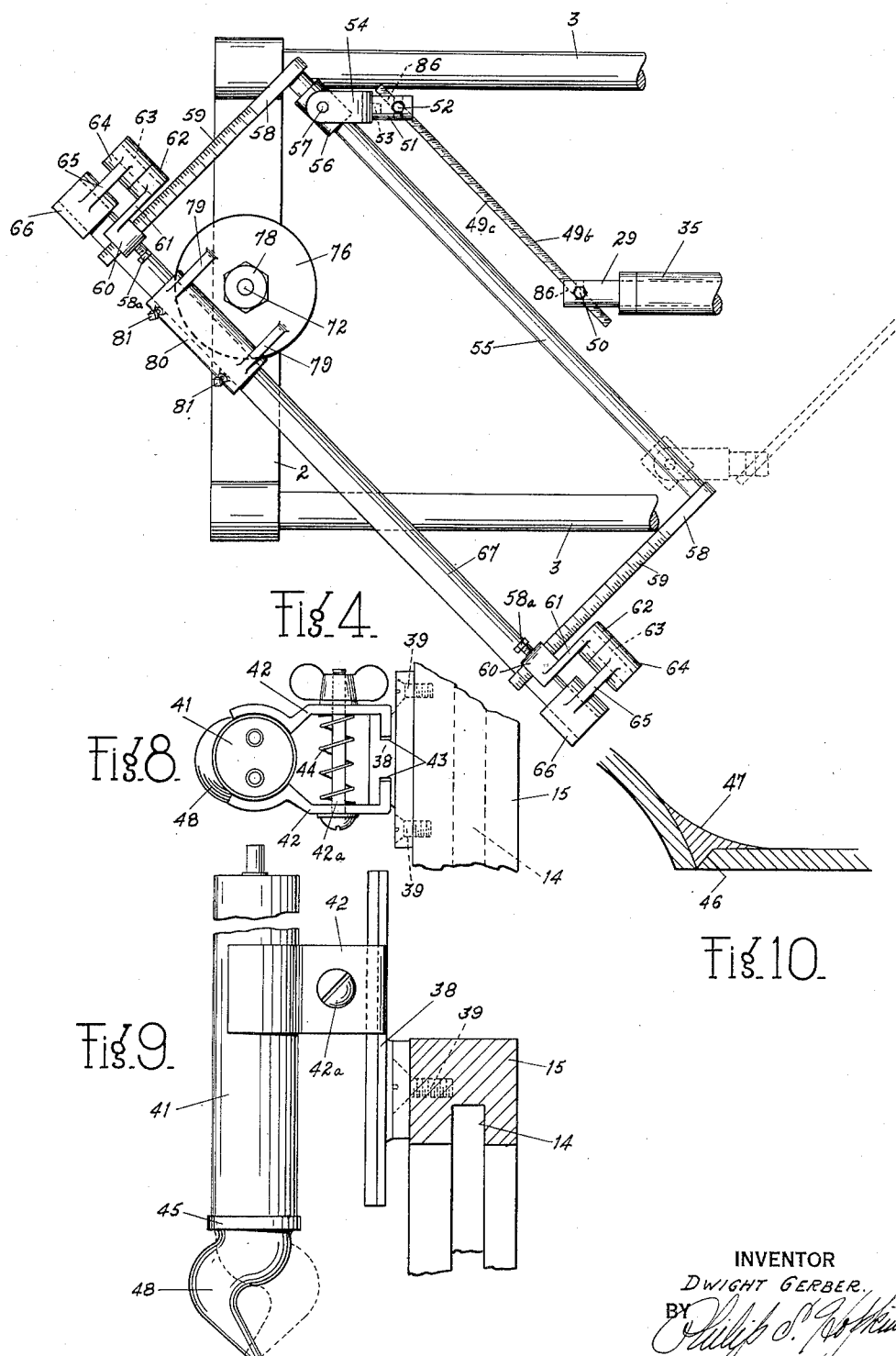
INVENTOR
DWIGHT GERBER.
BY
ATTORNEY Patented May 9, 1933

1,907,954

UNITED STATES PATENT OFFICE

DWIGHT GERBER, OF PITTSBURGH, PENNSYLVANIA

CYLINDER AND PIPE CUTTING MACHINE

Application filed May 15, 1931. Serial No. 537,671.

My invention relates to cylinder or pipe cutting machines and particularly to machines of this character adapted to cut and form the ends of pipes or cylinders for intersection with other pipes or cylinders of equal or larger sizes preparatory to the joining and subsequent welding of the same together.

My invention is particularly useful for forming the ends of pipes and cylinders or other tubular elements in the manner above indicated and I do not wish to be limited to its use in connection with any particular element although for illustrative purposes it will be described as used in connection with the cutting of pipe.

Pipe cutting machines of various types and character have been designed and used heretofore for this purpose but for the most part have proven generally unsatisfactory because of the time required for their use and the manual work and calculations necessary to properly execute work therewith. The primary object of my invention is to provide a composite machine which will, with a few simple settings, and adjustments, automatically describe the line of cut incident to the sizes of pipe involved and whether or not the intersection is to be on center or off center, at right angles or other than right angles. This eliminates the old method of mathematically plotting the desired intersection, making a template therefor, scribing the line on the pipe, fixing the scribed line with prick punches, etc. and finally following the line with a torch manually or guiding by some pantograph mechanism.

Another and important object of my invention is to provide a machine of this character which upon making the proper simple adjustments will rapidly, evenly and automatically generate the correct delineation or curvature on the end of the pipe which is to intersect another pipe and simultaneously cut the same on said line of delineation.

A further object of my invention lies in the provision of means whereby one of the adjustments, made with respect to the exact inside diameter of the pipe to be cut, and another adjustment made with respect to the outside diameter of the pipe to be intersected, results in a very accurate single line intersection which affords ultimately a strong, rigid and durable joint or intersection. This also insures a smooth joint for easy welding operations between pipes.

Another object of my invention is to provide a novel mechanical means for moving and guiding a cutting torch completely circumferentially around the pipe in one continuous operation whereby a smooth even cut is insured and with a minimum of effort and consequent use of gas provided for the cutting torch.

Still another object of my invention lies in the provision of means on the machine whereby the ends of pipes may be cut to intersect at right angles to or any angle up to and including 45 degrees either side of the longitudinal center line of the pipe to be intersected and either above or below center.

Another object lies in the provision of a novel angular reverse cutting tip for the torch used with my machine whereby the end of the pipe cut thereby may be simultaneously scarfed or chamfered in the desired direction and according to its relative position to the pipe to be intersected.

Other objects and advantages in details of construction and operation will be apparent as the description proceeds, reference now being had to the figures of the accompanying drawings forming a part of this application and wherein like reference numerals indicate like parts.

In the drawings:

Figure 4 is a detailed top plan view of one end of the machine illustrating the position of the axial beam for a lateral or angular cut.

Figure 8 is a detail end view of the cutting torch and its method of support.

Figure 9 is a top plan view of the same.

Figure 10 is a detail sectional view illustrating the joint or intersection of two pipes cut by my machine.

Figure 1:
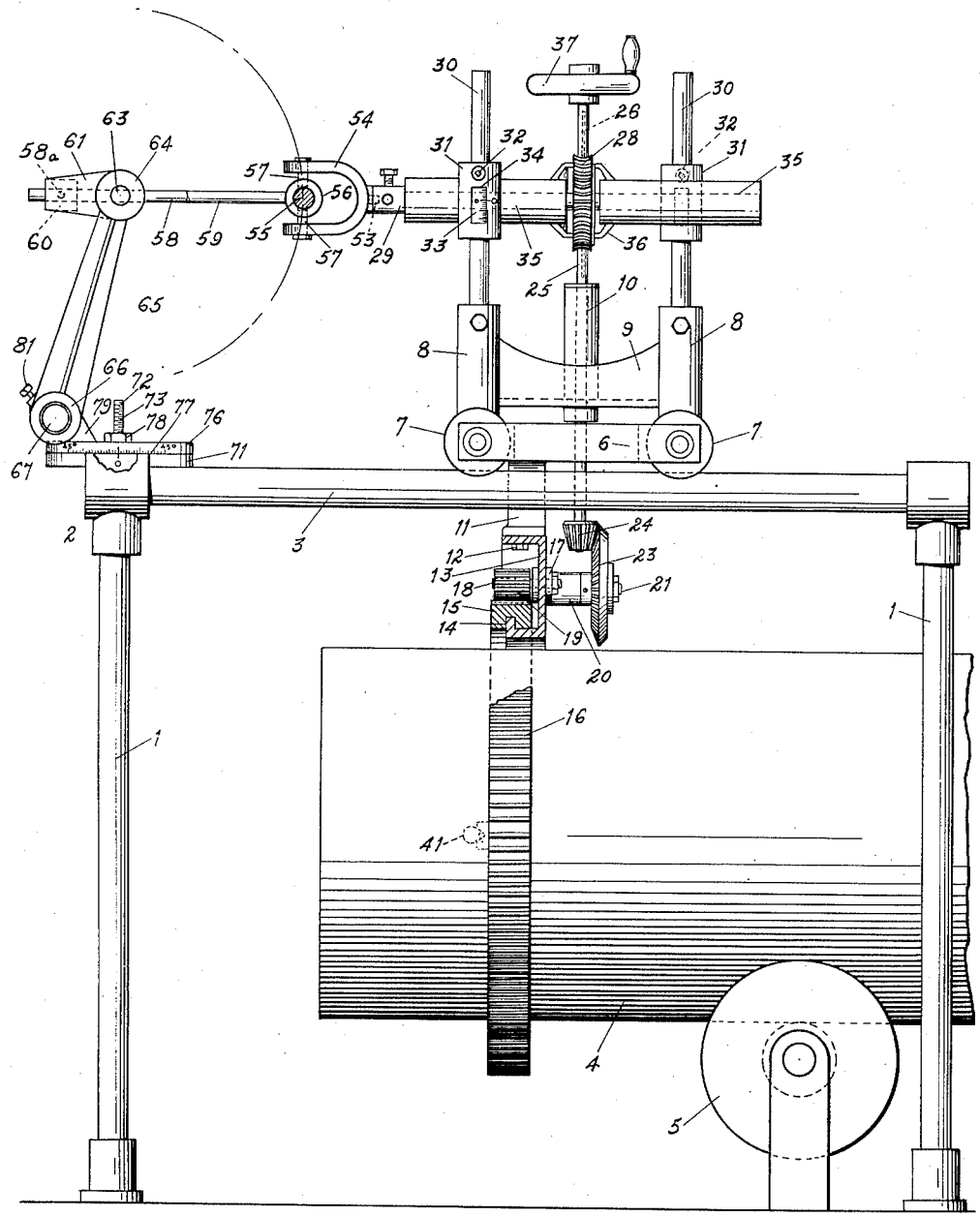
Figure 1 is a side elevation of my improved cutting machine.
Figure 2:
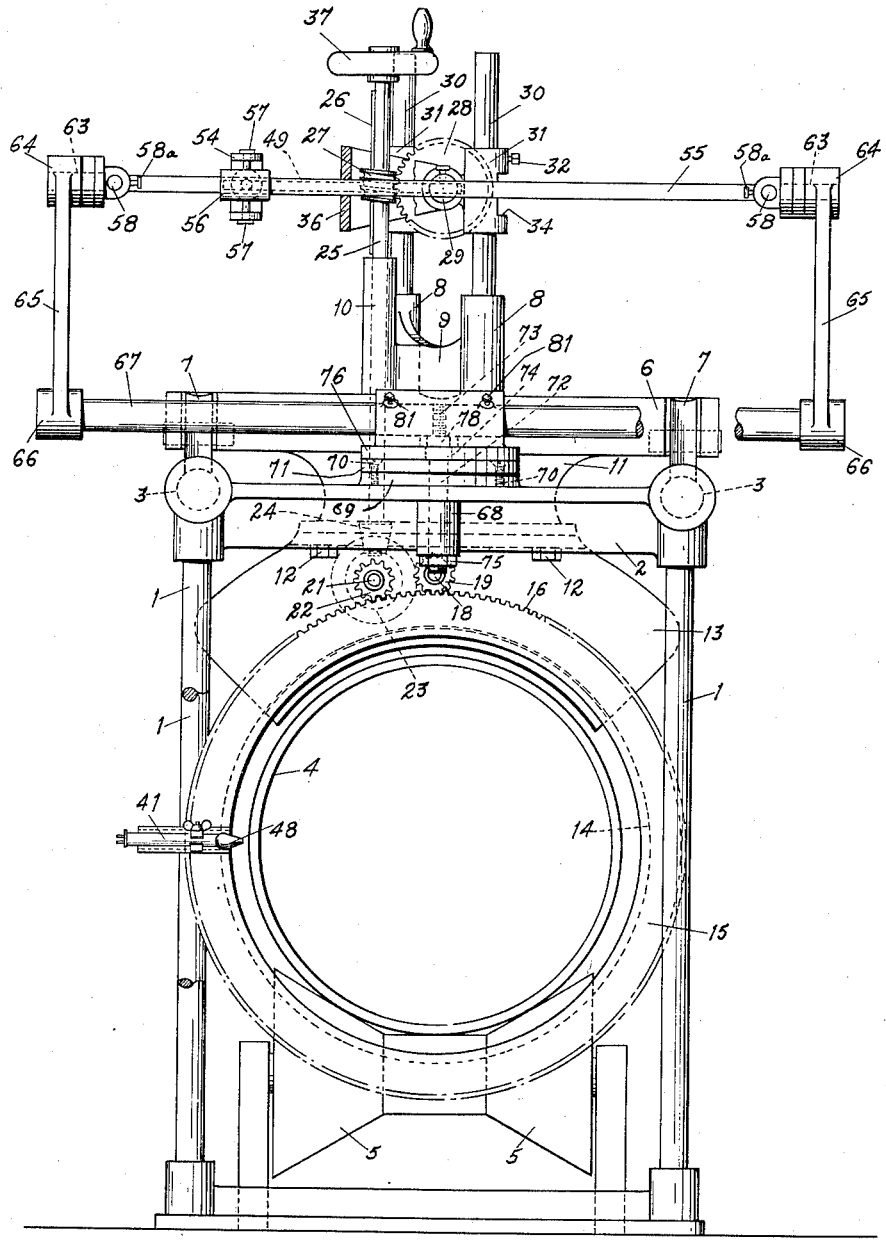
Figure 2 is a front elevation thereof, certain parts being broken away for clearness of illustration.

The reference character 1 indicates supporting posts forming a part of the supporting frame upon which my machine is mounted. These posts are shown as four in number and are connected at their upper ends at front and back by means of braces 2 and the front and rear posts are connected at their upper ends by tubular members 3 which provide trackways for a purpose to be described.

There is thus provided an open supporting frame into which and below the top thereof may be suitaby supported the end of the pipe 4 to be cut. The supporting means for the pipe 4 may be of any desired construction and for purposes of illustration beveled rollers 5 are provided for supporting the end of the pipe and permitting it to be easily adjusted longitudinally in the frame. These rollers 5 may be provided in different sizes or may be adjustably mounted whereby to compensate for varying sizes of pipe which may be placed in the machine for cutting. Mounted upon the trackways 3 for ready adjustment therealong is a carriage 6 supported upon the grooved wheels or rollers 7 riding upon the tracks 3. The carriage 6 is provided with a pair of upstanding sleeve bearings 8 connected by a preferably integral web 9 for strength. Also supported upon the carriage 6 and extending vertically therefrom is another sleeve bearing 10 for a purpose to be described.

Depending from the carriage 6 adjacent its front edge, is a downwardly extending supporting bracket 11, to the underside of which is secured as by bolts 12, a supporting hanger 13 preferably of channel cross section as shown in Figure 1 and the lower flanged edge of which engages within a groove 14 on the inner surface of a ring 15 through which the pipe 4 extends. The outer periphery of this ring 15 is toothed to provide the ring gear 16. This ring gear 16 may be provided by cutting the teeth on the ring itself or by securing thereon a separate toothed ring.

Centrally disposed on the supporting hanger 13 is a bearing 17 supporting a pin 18 upon which is mounted an idler gear 19 meshing with the teeth of the ring gear 16.

Also provided upon the supporting hanger 13 is a second bearing member 20 supporting a pin 21 upon which is mounted a pinion 22 meshing with the ring gear 16. The opposite end of the pin 21 extending rearwardly through the bearing 20, supports a beveled gear 23 meshing with a beveled gear 24 on the lower end of a vertically extending shaft 25 extending upwardly above the frame and through the sleeve bearing 10 on the carriage 6.

Slidably mounted upon the shaft 25, as by the key 26, and consequently rotatable with the shaft 25, is a worm 27. This worm 27 meshes with a worm gear 28 upon a horizontally disposed shaft 29 supported in the following manner.

Vertically supported within the bearing supports 8 on the carriage 6 are two rods or posts 30. Slidably mounted upon these posts 30 for vertical adjustment are the sleeve bearings 31 provided with set screws 32 whereby the sleeves may be locked in any adjusted positions on the posts 30. The posts are graduated as at 33 for a purpose hereinafter described and the sleeves 31 are provided with openings or windows 34 through which the graduations on the posts are visible. Supported by the sleeve bearings 31 and preferably integral therewith are horizontally disposed and aligned sleeve bearings 35 supporting the shaft 29. These sleeve bearings 35 are connected adjacent their inner ends by means of an offset bracket 36 which also serves to steady the upper end of the shaft 25 by acting as a guide for the worm 27 slidable on said shaft. This is clearly shown in Figure 3.

The upper end of shaft 25 is provided with a hand wheel 37 by means of which the shaft may be rotated. From the description so far it will be apparent that upon rotation of the shaft 25, the horizontal shaft 29 will be rotated as will also the ring gear 16 through the beveled gears 24 and 23 and the pinion 22. It should be stated here that the cutting torch is adjustably mounted upon the ring 15 as by means of the bracket 38 secured to the ring as by means of the bolts 39. Spring clips 40 are provided on the bracket 38 and at its outer end hold the cutting torch 41. The torch may be adjustably positioned in the clip both longitudinally and rotatively as indicated in Figure 9. It will be noted with reference to Figures 8 and 9 that the bracket 38 is grooved as at 43 to slidably receive the clips 42 whereby upon loosening the locking bolt 42a, such clips can be adjusted along the bracket, thus providing an additional longitudinal adjustment for the torch. A coil spring 44 encircles the bolt 42a between the clips 42 to render resiliency thereto.

The tip of the torch 41 is preferably rotatably mounted upon the end of the torch as by means of the frictional collar or flange 45 whereby the tip may be rotated to any desired position with respect to the pipe being cut. It will be noted with reference to Figure 9 that the tip is curved in a manner to bring the effective aperture thereof adjacent the pipe to be cut at an angle, whereby the actual cutting of the pipe is on an angle as shown at 46, in Figure 10. This provides for the accurate fitting of the inside diameter of the pipe being cut to the opening in the pipe to be intersected and leaves a groove for the welding material 47 whereby a smooth and substantial connection can be made. This curved tip of the torch is indicated by the reference character 48.

One end of the shaft 29 which is supported in the horizontal sleeves 35, carries at its end a rod 49 disposed at right angles thereto and preferably secured to the shaft 29 by means of a bolt 50. The opposite end of this rod 49 is secured to a lug 51 by means of the bolt 52 which lug is disposed at right angles to the rod 49. The rod 49 is suitably calibrated as at 49a for a purpose to be described. Rotatably swivelled to the free end of the lug 51 as at 53, is a U-shaped collar 54 extending on opposite sides of an axial beam 55 slidable upon which is a sleeve 56. The free ends of the collar 54 are provided with pins 57 which extend into and connect the collar with the sleeve 56. It will be clear from Figure 3, that the rod 49 may be adjusted longitudinally with respect to the end of the shaft 29 and also that the lug 51 carrying the collar 54 can be adjusted longitudinally of the rod 49 and consequently of the beam 55.

The ends of the beam 55 are supported by arms 58 which are calibrated as at 59 for a purpose to be described and the opposite ends of the arms 58 are adjustably supported in bearings 60 carried by the short links 61, the opposite ends of said links having bearings 62 pivotally mounted upon pins 63. Obviously, therefore, the beam 55 and the arms 58 are pivotally mounted upon the pivot pins 63. The beam 55 is hereinafter referred to as "swingable" since it must remain parallel to itself during its limited movement in a curved path.

The pins 63 are carried by bosses 64 on one end of the arms 65, the opposite ends of which terminate in bosses 66 mounted upon the ends of a cross bar 67 support in a manner hereinafter described.

The front member brace 2 is provided centrally with a downwardly extending boss 68 and on its upper surface with an enlarged boss 69 to which is secured as by screws 70 a flat plate 71. Extending through the boss 68 and 69 and plate 71 is a vertical pin 72 threaded as at 73 on its upper end. This pin is shouldered as at 74 just above the plate 71 and is provided at its lower end with a nut 75 whereby said pin is held in fixed vertical position.

Rotatably mounted upon the upper surface of the plate 71 and around the shouldered portion 74 of the pin 72, is a circular disk or plate 76 calibrated on its periphery as at 77 for a purpose to be described. A nut 78 is threaded on the upper end of the pin 72 whereby the disk 76 may be locked in adjusted relation to the plate 71.

The disk 76 is provided adjacent one edge with upstanding webs 79 supporting a sleeve bearing 80 through which passes the cross bar 67. The cross bar 67 is thus slidably mounted within the bearing 80 and set screws 81 are provided in said bearing 80 whereby the rod 67 and consequently the swinging frame comprising the arms 58 and beam 55, are slidably supported by the sleeve bearing 80 and adapted to be locked in adjusted position.

The operation of my invention will now be described with the parts of the machine adjusted for cutting pipe which is to intersect another pipe at right angles thereto whether on center or off center, namely, connections such as are shown at 82 and 83 in Figures 5, 6, and 7.

Assuming the pipe 4 to be adjusted to the proper position within the ring 15 on the rollers 5, namely, exactly centrally of the ring 15, the cutting torch 41 is next adjusted on the ring 15 to bring the tip 48 thereof into the desired cutting relation to the pipe 4, it having been determined in advance upon what angle the cut is to be made with respect to the inside diameter of the pipe. Next the sleeves 31 are adjusted vertically upon the rods 30 to the position desired with respect to whether the cut is to be made on center with respect to the pipe 4 or off center with respect thereto and if off center, whether above or below center. The zero calibration on the rods 30 indicate the proper position for a cut directly on center. If the cut is to be off center and below, the sleeves 31 are adjusted to the proper amount below the zero mark. If the cut is to be made off center and above, the sleeves 31 are adjusted to the proper position above the zero mark. For the purpose of this description and explanation, we will assume that a cut directly on center is to be made and the sleeves 31 are thus adjusted to the zero position on the rods 30. This adjustment, of course, positions the shaft 29 with the sleeves 31 as such shaft is carried by the bearings 35 integral with the sleeves 31. It will be noted that in this adjusted position of the shaft 29 it occupies a horizontal plane common to the arms 58 and extends at exactly right angles to pivot pins 63. Consequently, the swinging movement of the beam 55 and arms 58, will be concentric above and below the axis formed by the pivot pins 63. Thus the cut made on the pipe will be exactly on center.

Next the lug 51 carrying the collar 54 is adjusted longitudinally of the rod 49 to the calibration determined upon for the inside diameter of the pipe to be cut. The sleeve 56, of course, slides along the beam 55, permitting such adjustment. This adjustment is necessary to provide the cutting line for the particular size of pipe being cut measured by its inside diameter. Inasmuch as the rod 49 rotates with the shaft 29, the radius of the circle described by the arm 49 is thus proscribed to the inside diameter of the pipe to be cut.

The next adjustment is that of the arms 58 in the bearings 60 and such adjustment is effected with respect to the calibrations 59 for the outside diameter of the pipe to be intersected.

The set screws 58a are provided in the bearings 60 to lock the arms 58 in their adjusted positions. The adjustment of the arms 58 in the bearings 60 will, of course, position the carriage 6 and consequently the ring 15 with the cutting torch 41 properly with respect to the pipe 4.

Figure 3:
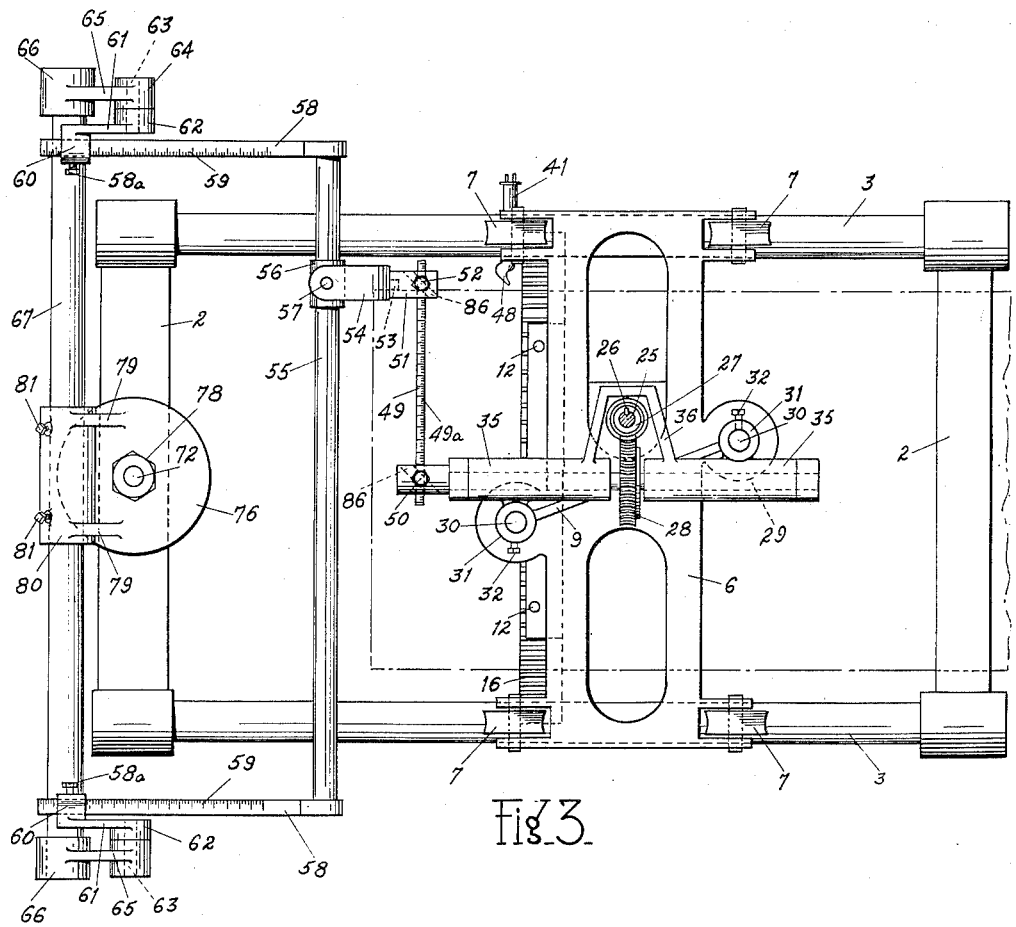
Figure 3 is a top plan view of the machine.

In this position of the elements of the machine, it will be noted that the frame comprising the bar 67, arms 58, and beam 55 is squared with the supporting frame and with the other elements of the machine, the disk 76 being adjusted on the plate 71 to said position and locked against movement as clearly shown in Figure 3.

The cutting operation is now ready to begin and with the torch 41 lighted and the proper heat for cutting obtained, the operator merely rotates the hand wheel 37 which rotation is communicated to the ring gear 16 and torch 41 through the beveled gears 24, 23 and the pinion 22. Simultaneously such movement is communicated to the shaft 29 through the worm 27 and worm gear 28. Rotation of the shaft 29 causes the rod 49 to rotate therewith and upon the initial upward movement of the end of the rod 49 carrying the lug 51, the beam 55 will be raised by virtue of the collar and sleeve connection 54 and 56. As the beam 55 is thus raised, it moves in an arc the radius of which extends from the pivot pins 63 to the beam 55, such arcuate movement serving through the sleeve and collar connection just described with the rod 49, to pull the carriage 6 and consequently the ring and torch forwardly on the trackways 3, until the rod 49 reaches its uppermost or vertical position. Thus the torch 41 on the first quarter turn of the pipe 4, describes a cutting path circumferentially of the pipe 4 and on a forward curvature with respect thereto. Continued rotation of the shaft 25 and consequently the rod 49 through the next quarter turn of the circle described by the rod 49, serves to again lower the beam 55 which results in again pushing the carriage 6 and the torch 41 rearwardly until the rod 49 reaches its horizontal position in alignment with but directly opposite to the initial position shown in Figure 3. Thus the cutting torch continues its cutting path circumferentially of the pipe 4 and simultaneously describes a rearward curvature with respect thereto which is symmetrical with the curvature previously cut. The cuts just described represent one half of the pipe as indicated by the line 84 in Figure 7. Continued rotation of the shaft 29 and of the rod 49 this time downwardly to vertical position, serves to swing the beam 55 downwardly and on its arc rearwardly, thus pulling the carriage forward again and permitting the torch to continue its circumferential cutting path on the pipe with the said curvature symmetrical with those already formed. Continued rotation of the shaft 29 and of the rod 49 from the downward vertical position back to the original horizontal position shown in Figure 3 serves to swing the beam 55 up again to the original position shown in Figures 1 and 3, such upward swinging through its arc returning the carriage and torch to original position and completing the lower half of the cut on the pipe.

Thus there is provided a machine which by the use of a few simple adjustments, is enabled to automatically describe a reentrant curved cutting path on the end of a pipe making a smooth, accurate and perfectly symmetrical cut for intersecting an opening in another pipe.

Figure 6:
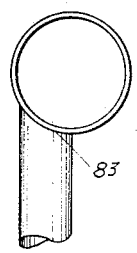
Figure 6 is an end view more clearly showing an offset intersection.
Figure 7:
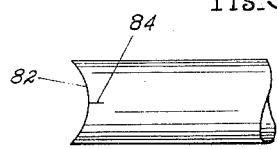
Figure 7 is a detail side view of a piece of pipe showing a curved cut formation for intersection on one end thereof.

It will be clear that if it is desired to make the cut on the pipe of such shape and character that it will join the pipe to be intersected at a position offset from the center thereof, as shown clearly in Figure 6, it is necessary only to adjust the sleeves 31 vertically on the rods 30 either up or down depending upon which side of center the connection is to be made. This results in lowering or raising the beam 55 so that its initial starting position is off center with respect to the pivotal axis 63 thereof and consequently the arc which said beam describes will be longer on one side of center and shorter on the opposite side of center each time it swings. This variation in movement is, of course, communicated back to the carriage 6 in the manner above described, causing the carriage and cutting torch to move a less distance forward and back upon one half of the revolution of the torch than on the other half of such revolution, resulting in the torch defining a cutting path similar to that shown in Figure 6, and thus providing a cut which permits the pipe so cut to intersect another pipe off center with respect thereto.

Figure 5:
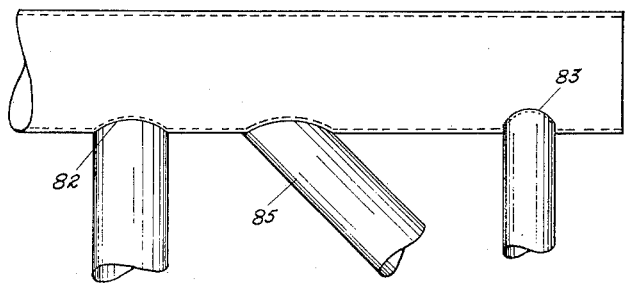
Figure 5 is a top plan view showing the various types of cuts which can be made for intersections with my machine.

Sometimes it may be desired to make a cut which will permit the pipe so cut to intersect another pipe at less than a right angle thereto, as shown at 85 in Figure 5. To set the machine for such a cut, the bolts 50 and 52 are loosened or removed and the rod 49 removed from the end of the shaft 29 and the lug 51. It should be stated here that the ends of the shaft 29 and the lug 51 are provided with openings therethrough indicated in dotted lines at 86 disposed at an angle of 45 degrees to the shaft and lug. A rod 49b of a trifle greater length than the rod 49 and with calibrations 49c angularly disposed thereon is inserted through these angular openings as shown clearly in Figure 4 and the bolts 50 and 52 again tightened after the proper adjustment of the lugs 51 on the rod 49 has been made for the pipe size and in accordance with the inside diameter thereof. The set screws 81 on the sleeve 80 are now loosened and the nut 78 on the pin 72 is loosened whereupon the disk 76 may be rotated on the plate 71 until the calibrations 77 indicate the angle of cut desired. The nut 78 is then tightened. Obviously as the disk 76 is turned, the entire frame consisting of the bar 67, arms 58, and beam 55 is turned at an angle to the machine and during such turning, because of the connection of the rod 49 by the shaft 29 and lug 51, the rod 67 slides through the bearing 80 to compensate for such angular disposition of the frame. The set screws 81 may now be tightened again thus locking the bar 67 to the sleeve 80. The pins 57 in the collar 54 permit said collar to swivel with respect to the sleeve 56, as shown clearly in Figure 4. It is obvious, of course, that the direction which this angular adjustment may take is optional depending upon the direction which it is desired or necessary that the pipe to be cut intersects the other pipe.

With the parts in this position, the same operation as before described is performed and the same functions of the elements prevail exactly as before described, except that the cutting path described by the torch will be angularly (up to 45 degrees) with respect to the end of the pipe, as shown at 85 in Figure 5. This is, of course, brought about by the angular position of the beam 55 with respect to the pipe to be cut, the swinging of the beam 55 through its proscribed arc, being the same as before described. However, on the first quarter movement around the circle described by the rod 49 the movement of the carriage 6 is determined by the position of the sleeve 56 on the beam 55, which position, because of the angular disposition of the beam, is nearer the end of the pipe being cut than during the second quarter revolution of the rod 49, during which the sleeve 56 slides along the beam 55 to the dotted line position shown in Figure 4 in which position the carriage is naturally moved a greater distance rearwardly with respect to the end of the pipe than during the first quarter revolution. The third quarter revolution is really a duplication of the second quarter revolution with the beam 55 now swinging downwardly and the sleeve 56 sliding back along said beam. The fourth quarter revolution duplicates the first quarter and the sleeve 56 is returned to the original position.

It will be understood, of course, that cuts of this character for angular intersections may be made with respect to the center of the pipe to be intersected or off center with respect thereto depending upon the adjustment of the sleeves 31 on the rods 30, the same as before described.

It will thus be seen that I have provided a composite machine which with very few adjustments can be made to automatically describe and cut the ends of pipe for intersecting another pipe at any angle or position desired.

Of course, changes may be made in details of construction and arrangement of parts without departing from the spirit and scope of my invention. I do not limit myself to the exact form herein shown and described except as indicated by the appended claims.

I claim:

1. A cutting apparatus for forming the end of a cylinder for intersecting connections comprising a cutting torch, a movable holder for said torch adapted to move said torch in cutting position circumferentially around a fixed cylinder, a carriage upon which said holder is mounted, said carriage and holder being movable longitudinally of the cylinder, and means including a swingable beam connected with said carriage for moving said carriage and holder longitudinally of the cylinder simultaneously with the circumferential movement of the holder and to a predetermined extent whereby said torch generates and cuts the cylinder on a required line.

2. A cutting apparatus for forming the end of a cylinder for intersecting connections comprising a cutting torch a movable holder for said torch adapted to move said torch in cutting position circumferentially around a fixed cylinder, a carriage upon which said holder is mounted, said carriage and holder being movable longitudinally of the cylinder, means including a swingable beam connected with said carriage for moving said carriage and holder longitudinally of the cylinder simultaneously with the circumferential movement of the holder and to a predetermined extent whereby said torch generates and cuts the cylinder on a required line, and a single operating means for causing the movements of said carriage and holder.

3. A cutting apparatus for forming the end of a cylinder for intersecting connections comprising a cutting torch, a movable holder for said torch adapted to move said torch in cutting position circumferentially around a fixed cylinder, a carriage upon which said holder is mounted, said carriage and holder being movable longitudinally of the cylinder, means including a swingable beam connected with said carriage for moving said carriage and holder longitudinally of the cylinder simultaneously with the circumferential movement of the holder and to a predetermined extent whereby said torch generates and cuts the cylinder on a required line, and means for adjusting the lateral position of said beam with respect to said carriage and holder whereby the movement of said carriage is modified to generate a line of cut angular with respect to the longitudinal axis of said cylinder.

4. A cutting apparatus for forming the end of a cylinder for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a swingable beam on said frame, and adjustable connections between said beam and said carriage whereby the longitudinal movement of said carriage is governed by said beam to generate a required line of cut on the cylinder upon the simultaneous movement of said carriage and holder.

5. A cutting apparatus for forming the end of a cylinder for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a swingable beam on said frame, adjustable connections between said beam and said carriage whereby the longitudinal movement of said carriage is governed by said beam to generate a required line of cut on the cylinder upon the simultaneous movement of said carriage and holder, and a single operating means for simultaneously moving said carriage and said holder.

6. A cutting apparatus for forming the end of a cylinder for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a swingable beam on said frame, adjustable connections between said beam and said carriage whereby the longitudinal movement of said carriage is governed by said beam to generate a required line of cut on the cylinder upon the simultaneous movement of said carriage and holder, a turntable on said frame carrying said beam, and means for adjusting said turntable to selectively position said beam laterally with respect to said carriage whereby the movement of said carriage and holder is modified to generate a line of cut offset with respect to the longitudinal axis of said cylinder.

7. A cutting apparatus for forming the end of a cylinder for intersecting connections comprising a cutting torch, a movable holder therefor including a ring gear adapted to encircle a cylinder in fixed relation therewith, and means for rotating said ring gear and torch around the cylinder and for simultaneously moving them longitudinally of the cylinder to generate and cut a required line around the cylinder.

8. A cutting apparatus for forming the end of a cylinder for intersecting connections comprising a cutting torch, a movable holder for said torch adapted to move said torch in cutting position circumferentially around a fixed cylinder, a carriage upon which said holder is mounted, said carriage and holder being movable longitudinally of the cylinder, means including a swingable beam connected with said carriage for moving said carriage and holder longitudinally of the cylinder simultaneously with the circumferential movement of the holder and to a predetermined extent whereby said torch generates and cuts the cylinder on a required line, and means for selectively adjusting the position of said beam vertically with respect to said carriage and holder whereby the movement of said carriage is modified to generate the required offset line of cut on said cylinder for an off center intersection.

9. A cutting apparatus for forming the end of a cylinder for intersecting connections comprising a cutting torch, a movable holder for said torch adapted to move said torch in cutting position circumferentially around a fixed cylinder, a carriage upon which said holder is mounted, said carriage and holder being movable longitudinally of the cylinder, means including a swingable beam connected with said carriage for moving said carriage and holder longitudinally of the cylinder simultaneously with the circumferential movement of the holder and to a predetermined extent whereby said torch generates and cuts the cylinder on a required line, and means for selectively adjusting the lateral and vertical position of said beam with respect to said carriage and holder whereby the movement of said carriage is modified to generate a line of cut angular and offset with respect to the longitudinal axis of said cylinder.

In testimony whereof, I affix my signature.

DWIGHT GERBER.